United States Patent [19]

Cohen et al.

[11] Patent Number: 4,603,481
[45] Date of Patent: Aug. 5, 1986

[54] BUMPER INDICATOR

[75] Inventors: Howard Cohen, Plainview; Alois Dauer, Middle Island, both of N.Y.

[73] Assignee: Irwin Measuring Tool Co., Patchogue, N.Y.

[21] Appl. No.: 652,315

[22] Filed: Sep. 19, 1984

[51] Int. Cl.$^4$ .............................................. G01C 3/10
[52] U.S. Cl. ................... 33/138; 242/84.8; 242/107.2
[58] Field of Search ............ 16/86 R, 86 A; 242/107.2; 33/138, 137 R; 242/84.8

[56] References Cited

U.S. PATENT DOCUMENTS

| 2,106,053 | 1/1938 | Laingor | 242/84.8 |
| 3,324,560 | 6/1967 | Snyder | 242/107.2 X |
| 3,499,612 | 3/1970 | Zelnick | 242/107.2 X |

FOREIGN PATENT DOCUMENTS

| 662255 | 4/1963 | Canada | 242/107.2 |
| 2805588 | 8/1979 | Fed. Rep. of Germany | 242/107.2 |
| 103030 | 11/1941 | Sweden | 242/107.2 |

Primary Examiner—William D. Martin, Jr.
Attorney, Agent, or Firm—Pasquale A. Razzano

[57] ABSTRACT

A bumper indicator is disclosed which is adapted to be used on the tape rule of a measuring tool. The bumper indicator is a one piece resilient member having front and rear surfaces and a transverse slit whose configuration is selected to be generally complimentary to the cross sectional configuration of the tape rule on which it is mounted, thereby to frictionally engage and slidably receive the tape rule. The bumper has top and bottom edges and the rear surface of the bumper facing the casing for the tape measure is chamfered from a position below the slit to the bottom edge. The bumper serves to cushion recoil of the tape, as well as to provide an indicator along the tape when it is extended to facilitate repetitive measurements.

17 Claims, 6 Drawing Figures

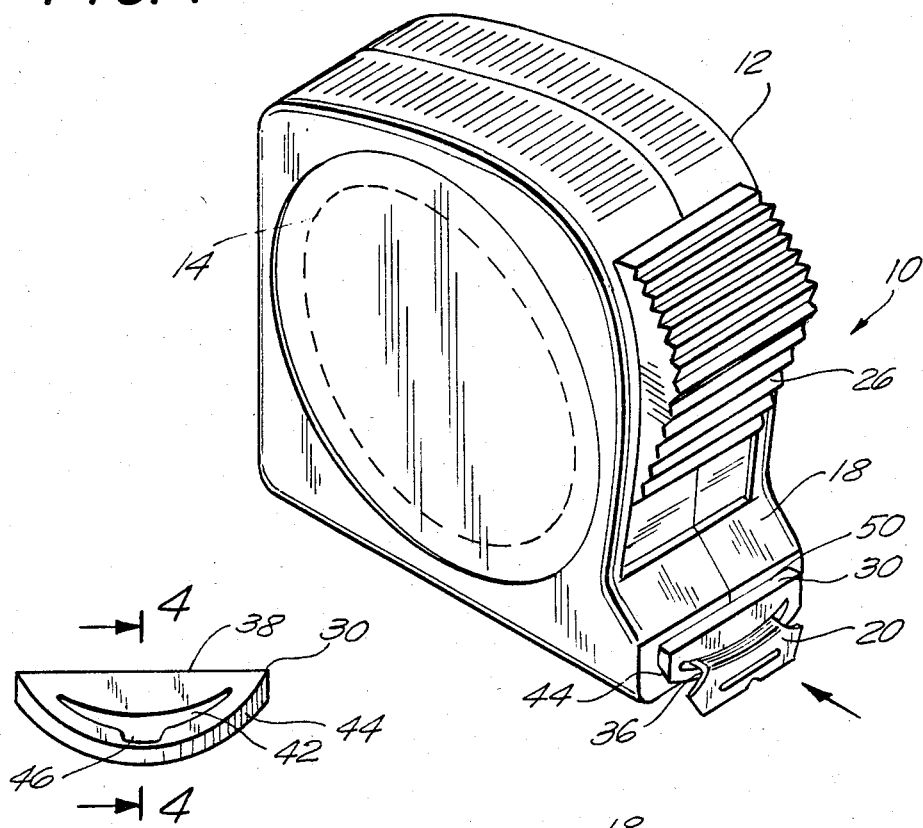
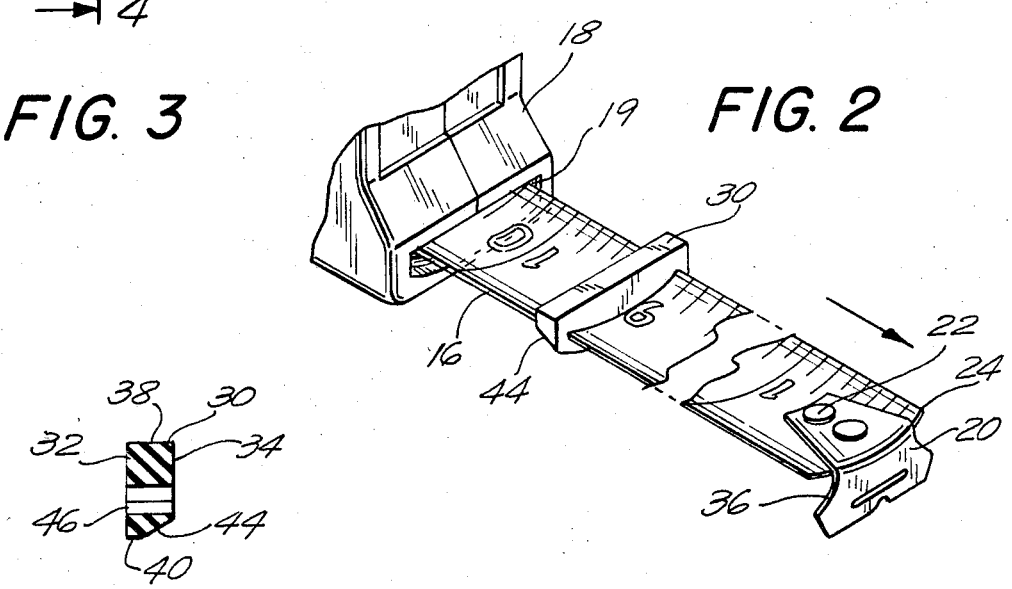

BUMPER INDICATOR

The present invention relates to measuring tapes, and more in particular to a bumper indicator for a tape rule.

In the art of measuring tapes, it has been previously proposed to provide bumpers on the casing of the measuring tape in order to cushion recoil of the tape. These bumpers are typically integrally formed with or mounted within the front wall of the tape. Examples of these constructions are shown in U.S. Pat. Nos. 3,578,259 and 3,905,114 wherein rubber bumpers are mounted within the front edge of the casing. U.S. Pat. No. 3,521,831 illustrates a tape measure wherein the casing itself is formed to have a certain degree of resilience at its front end to cushion the recoil of the tape measure hook upon retraction of the tape. Other similar mechanisms mounted in or formed as part of the front end of the casing are disclosed in U.S. Pat. Nos. 3,519,219 and 3,519,220.

The prior art also discloses devices which are attachments to a tape rule that will lock the rule in an extended position or which can be locked to the tape to permit repetitive measurements. For example, U.S. Pat. No. 3,324,560 discloses a stop device which is mounted on the tape rule itself and can be slid transversely into position to grip the rule tightly and abut against the casing of the tape measure, to prevent retraction of the tape beyond a predetermined point, to facilitate repetitive measurements.

Other indicator devices are shown for example in U.S. Pat. Nos. 650,136; 2,396,877; 650,136; 2,778,118; 3,289,305; 3,744,134; and 2,591,333. However, none of these devices serves the dual function of providing a bumper arrangement and a slide indicator which will conveniently and automatically operate.

It is an object of the present invention to provide a bumper slide indicator for a measuring tape.

Another object of the present invention is to provide a bumper on a measuring tape which will also act as a measuring indicator.

A further object of the present invention is to provide a bumper slide indicator in a one piece construction which is relatively inexpensive to manufacture.

Yet another object of the invention is to provide a bumper slide indicator which is durable in construction and convenient to use.

A still further object of the present invention is to provide a bumper indicator which is configured to permit convenient and automatic use.

In accordance with an aspect of the present invention a tape measure is provided which includes a casing having a front wall and an extensible and retractable tape rule mounted within the casing. Preferably the tape rule is connected to a spring drive motor of conventional construction which will automatically retract the tape unless it is locked in an extended position by a locking mechanism known in the art. The tape rule extends through the front wall of the casing and has a tape hook mounted on its free end by rivets or in any other conventional manner. A one piece resilient bumper is slidably mounted on the tape rule and has front and rear surfaces. The bumper includes a transverse slit formed in the front and rear surfaces having a configuration selected to be generally complimentary to the cross sectional configuration of the tape rule. Thus the bumper frictionally engages and slidably receives the tape rule. The bumper also has top and bottom edges and the rear surface of the bumper facing the casing is chamfered from a position below the slit to the bottom edge. The bumper indicator will remain in a fixed position on the tape rule when the tape is extended unless it is held by the operator. When moved to a particular position on the tape it will remain in that position due to its frictional engagement with the tape until it moves manually or until the tape is retracted. Upon retracting of the tape, the tape is drawn back into the housing and ultimately the bumper indicator engages the front face of the tape measure casing. Continued retraction of the tape measure causes the tape rule to pass through the bumper and ultimately the hook end engages the bumper. Since the bumper is formed of a resilient material such as rubber, the bumper cushions the retraction of the tape and extends its useful life. In addition, in the extended position the bumper marks a particular measurement on the tape, so that the measurement can be repeated over and over again.

The above, and other objects, features and advantages of this invention will be apparent in the following detailed description of illustrative embodiments thereof, which is to be read in connection with the accompanying drawings, wherein:

FIG. 1 is a perspective view of a tape measure having a bumper indicator constructed in accordance with the present invention;

FIG. 2 is a partial perspective view showing the tape rule in an extended position with the bumper located at a position along the tape for use in repetitive measurements;

FIG. 3 is a plan view of the rear surface of the bumper indicator;

FIG. 4 is a cross sectional view taken along line 4—4 of FIG. 3;

Figure 5:
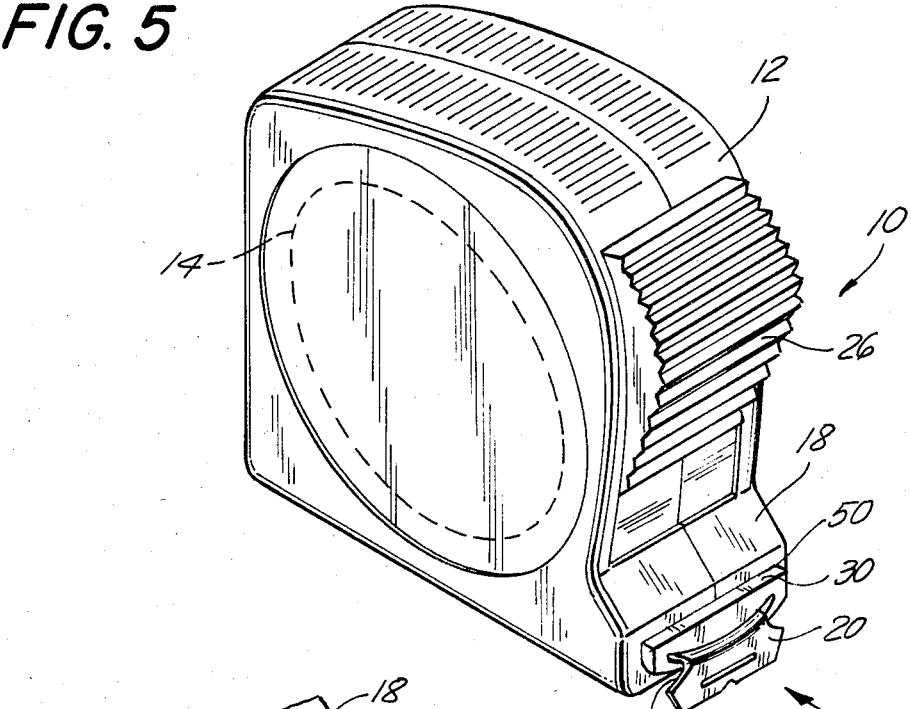
FIG. 5 is a perspective view similar to FIG. 1 of another embodiment of the present invention.

Referring now to the drawings in detail, and initially to FIG. 1 thereof, a tape measure 10 constructed in accordance with the present invention is illustrated. The tape measure includes a casing 12 typically formed as two substantially identical halves containing a spring wound motor 14 (shown in phantom lines) to which is connected a coiled measuring tape or tape rule 16, formed of metal or the like. As is known in the art, one end of the tape rule (which is typically formed of metal) is connected to spring motor 14 and the other free end thereof extends through an opening in the front wall 18 of the casing. A metal tape hook 20 is secured by rivets 22 or the like to the free end 24 of the tape rule 16. The tape hook serves to hold the free end of the tape on an object when a measurement is being made and also blocks complete retraction of the tape into the casing.

The tape measure of the present invention includes a locking button 26 which is slidably mounted on front wall 18 and serves to control a slide member within the casing that will lock the tape rule in an extended position. Thus, when the user wishes to make a measurement, the hook 20 is positioned over one edge of the object to be measured and the tape is extended until the length to be measured is reached. At that point, the button 26 is slid downwardly and the slide member in the case (not shown) is urged against the tape rule and frictionally holds it in the extended position against the bias of the motor 14. Such locking mechanisms are well known in the art and need not be disclosed in detail. Tape rules containing such locking mechanisms are available from the assignee of this application, Irwin Measuring Tool Company.

In accordance with the present invention a one piece bumper indicator 30 is slidably mounted on the tape rule 16. The bumper indicator serves two main purposes, as described hereinafter.

Figure 6:
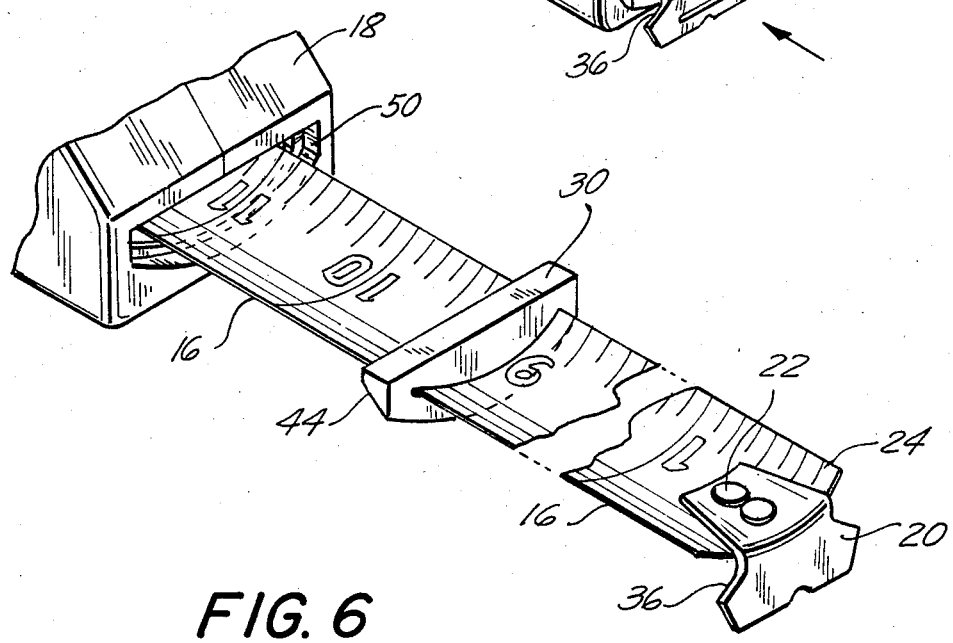
FIG. 6 is a partial perspective view similar to FIG. 2 of the embodiment of FIG. 5 wherein the bumper indicator is adapted to be received within a recess in the front wall of the casing.

Referring more particularly to FIGS. 3 and 4, bumper indicator 30 is formed of a resilient material, such as for example, rubber. It has a front face 32 and a rear face 34. The front face faces the rear face 36 of tape hook 20 when the bumper indicator is mounted on the tape measure. The bumper indicator also includes a top edge 38 and a bottom edge 40. A slit 42 is formed through the bumper indicator from the front wall to the back wall thereof. This slit has a configuration in plan, as seen in FIG. 3, which is generally complimentary to the cross sectional configuration of the tape rule 16. Thus, as seen in FIG. 2 the tape rule 16 has a generally arcuate configuration (which as known in the art aids in giving the tape longitudinal stability when measuring). The slit 42 is dimensioned to receive the tape and be frictionally engaged therewith. For purposes described hereinafter, the rear face 34 of the bumper indicator is chamfered in the area 44 below the slit on the side thereof which faces the casing 12. This chamfered area 44 may be flat, or angled, as seen in FIG. 4, or it may be curved, as seen in the embodiment of FIG. 6.

The slit 42 also includes a transverse groove 46, which permits the bottom heads of the rivets 22 to pass easily through the slit when the tape is retracted into the position shown in FIG. 1. If the rivet heads are flat enough, or if some other means for attaching the tape hook 20 to the tape rule 16 are used, which do not have bottom projections, then the groove 46 may be eliminated.

The bumper indicator of the invention is preferably placed on the tape rule before the hook 20 is secured thereto with the rivets 22. However, due to the resilient nature of the material of which the bumper indicator is formed, the bumper indicator can be placed on the tape rule over the hook 20 without harm thereto.

In the at rest position shown in FIG. 1, the bumper indicator 30 has its rear face 34 in abutting engagement with the front face 18 of the casing 12. The tape is fully retracted within the casing and only the end of the hook 20 projects therefrom. When it is required to measure an object, the hook 20 is either manually withdrawn from the casing or hooked over an object and the casing moved away therefrom. This will cause the tape to unwind from the motor 14 and extend through the front opening 19 in the front wall 18 of the casing. Preferably the bumper indicator is held manually as the tape is retracted until the length of the object to be measured is attained. Then the rear face of the bumper indicator is aligned with the end of the object to mark the distance measured. This measurement can then be repeated by the user to measure out identical distances. In FIG. 2, the bumper indicator 30 is placed at the nine inch mark for illustrative purposes. With this position, and with the lock mechanism holding the tape in its extended position, that nine inch measurement can be repeated from work piece to work piece as desired.

When the tape is retracted, upon release of the lock button 26, tape 16 is drawn back within casing 12. Since the bumper indicator 30 is closer to the casing than the hook 20, it first engages the front wall 18 of the casing, and its movement is stopped. The tape however continues to retract through the slit in the bumper indicator into the casing. Ultimately the hook 20 engages the bumper indicator and further retraction of the tape is not possible.

As a result of this construction, in addition to repetitive measurement indication, the bumper indicator serves to reduce the tendency of tape hooks to break upon retraction by providing a resilient bumper surface for the hook end to impact against after retraction. The shock absorption provided by the bumper indicator upon retraction of the tape hook is supplemented by the fact that the frictional engagement of the bumper indicator with the tape measure serves to reduce return speed for the tape after the bumper indicator engages the front wall, thereby reducing the momentum of the tape hook 20 upon impact with the bumper indicator.

The construction of the bumper indicator of the present invention also permits it to be used to measure the depths of holes or other objects in a convenient manner. For example, in measuring the depth of a hole, the tape is extended into the hole while the operator holds the bumper indicator with its rear surface 34 flush against the top of the hole. When the end of the tape reaches the bottom of the hole the measurement on the tape rule aligned with the flat rear surface 34 of the bumper indicator gives the depth of the hole.

The provision of the chamfered surface 44 on the rear face of the bumper indicator is an important aspect of the invention. Preferably, the height of this chamfered surface is less than the height of the hook surface so that when the hook end of the tape is placed over the edge of an object and the bumper is against the hook, the chamfered surface, if it engages the object, will not hook onto the object but instead will permit the object's edge to slide off the bumper onto the flat rear surface of the hook. Thus the object's edge is engaged with the hook for accurate measurement without interference from the bumper.

As mentioned, the bumper indicator is typically provided with a complete measuring tape, however it can be sold as a replacement part or as an addition for existing tapes since due to its resilient nature it can be slipped over the hook for placement on the tape.

In the embodiment of the invention shown in FIG. 5, the tape measure casing 12 is of the same construction as that illustrated in the embodiment of FIG. 1, except that in this case the front wall 18 of the casing 12 has a recess 50 formed therein which is generally complimentary to the shape of the bumper indicator 30 so that upon retraction of the tape into the casing, the bumper indicator fits within the recess 50 in a more compact configuration. This embodiment of the invention also illustrates, as most clearly seen in FIG. 6, that the chamfered surface 44 may be arcuate, in cross section, rather than flat as in the embodiment shown in FIG. 4.

Accordingly, it is seen that a relatively simply constructed bumper indicator is provided which serves multiple purposes. The indicator permits iterative marking, while serving as a brake and cushion upon retraction of the tape.

Although illustrative embodiments of the invention have been described herein with reference to the accompanying drawings, it is to be understood that the invention is no limited to those precise embodiments, but that various changes and modifications may be affected therein by those skilled in the art without departing from the scope or spirit of this invention.

I claim:

1. A bumper indicator for use with a measuring rule including a casing, a tape having markings thereon wound within the casing for extension and retraction therefrom and including a free end extending from the casing with a tape hook thereon and a tape retraction mechanism for automatically retracting the tape into the casing, said bumper indicator comprising a one-piece resilient bumper having front and rear surfaces and a transverse slit formed therein, said slit having a configuration selected to be generally complementary to the cross-sectional configuration of the tape rule on which it is to be mounted and being dimensioned to frictionally engage the tape rule and remain in a relatively fixed position relative to markings on the tape when the tape rule is extended while slidably receiving the tape rule to permit the tape rule to pass freely therethrough under the influence of the tape retraction mechanism when the bumper is engaged against the casing; said bumper also having top and bottom edges; said rear surface of the bumper facing away from the tape hook and being chamfered from a position below the slit to said bottom edge.

2. A bumper indicator as defined in claim 1 wherein said rear face is flat above said slit.

3. A bumper indicator as defined in claim 1 wherein said front surface is flat between said top and bottom edges.

4. A bumper indicator as defined in claim 1 wherein said bottom edge is curved.

5. A bumper indicator as defined in claim 4 wherein said top edge is flat.

6. A bumper indicator as defined in claim 1 wherein the chamfer of said rear surface is flat in cross section.

7. A bumper indicator as defined in claim 1 wherein the chamfer of said rear surface is curved in up sections.

8. A bumper indicator as defined in claim 1 wherein said slit has a transverse groove formed therein to permit passage of means attaching said hook to the tape.

9. A tape measure comprising a casing having a front wall, an extensible and retractable tape rule mounted in said casing and extending through said front wall, said tape rule having measurement markings thereon and a free end extending from the casing; a tape hook mounted on a free end of the tape rule; means for retracting the tape into the casing through said front walls; and a one-piece resilient bumper slidably mounted on said tape rule, said bumper having front and rear surfaces and a transverse slit formed therein, said slit having a configuration selected to be generally complementary to the cross-sectional configuration of the tape rule and being dimensioned to frictionally engage said tape rule to hold itself in a relatively fixed position relative to a selected marking on the tape when the tape rule is extended and to slidably receive the tape rule with sufficient freedom of movement to permit the tape rule to move through said slit under the influence of the retracting means when the bumper is engaged with said front wall; said bumper also having top and bottom edges; said rear surface of the bumper facing the front face of the casing and being chamfered from a position below the slit to said bottom edge.

10. A tape measure as defined in claim 9 wherein said rear face is flat above said slit.

11. A tape measure as defined in claim 10 wherein said bottom edge is curved.

12. A tape measure as defined in claim 11 wherein said front surface is flat between said top and bottom edges.

13. A tape measure as defined in claim 12 wherein said top edge is flat.

14. A tape measure as defined in claim 13 wherein the chamfer of said rear surface is flat in cross section.

15. A tape measure as defined in claim 13 wherein the chamfer of said rear surface is curved in cross section.

16. A tape measure as defined in claim 13 wherein said hook is secured to the tape rule by rivets and said slit has a transverse groove formed therein to permit passage of said rivets.

17. A tape measure as defined in claim 13 wherein said front wall of said casing has a recess formed therein which is generally complementary and adopted to receive said bumper.

* * * * *